Dec. 1, 1936.    T. ZUSCHLAG    2,062,630
METHOD AND APPARATUS FOR ELECTRICAL PROSPECTING
Filed May 3, 1934
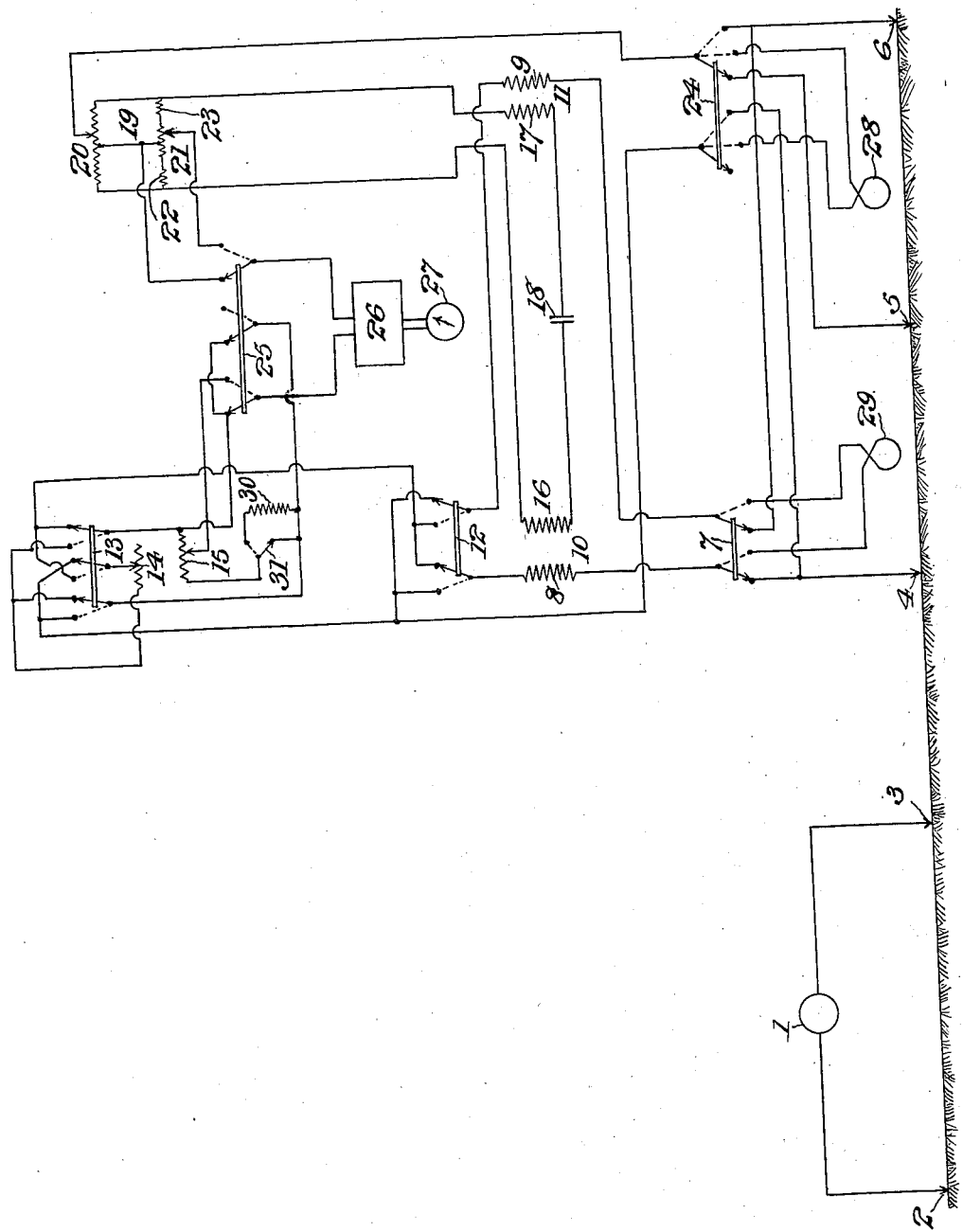
INVENTOR
*Theodor Zuschlag*
*by Brosseward*
*his ATTORNEYS*

Patented Dec. 1, 1936

2,062,630

UNITED STATES PATENT OFFICE 2,062,630

METHOD AND APPARATUS FOR ELECTRICAL PROSPECTING

Theodor Zuschlag, West Englewood, N. J., assignor to Hans T. F. Lundberg, New York, N. Y.

Application May 3, 1934, Serial No. 723,669

15 Claims. (Cl. 175—182)

This invention relates to electrical prospecting, and has for an object to provide an improved method and apparatus for the determination of ground potential and electromagnetic field ratios for the purpose of aiding in predetermining the location, character, quantity, and quality of deposits.

Another object consists in providing method and apparatus which have a greater range of application than those heretofore known, and which embody a simpler and more accurate mode of operation as well as simpler and more rugged type of construction.

Another object consists in the provision of a transformer coupled potentiometer combination useful in effecting the balancing or compensation of the current in the operation of the method and apparatus; whereby the range of application is materially enhanced.

Another object consists in the provision of a potentiometer in substitution for two independent resistances, whereby the construction and operation are materially simplified.

Another object consists in providing improvements leading to more accurate results attainable by easier and faster calibration of the apparatus constants without the necessity of employing auxiliary instruments or acquiring knowledge of additional data.

A further object consists in providing certain improvements in the form, construction and arrangement of the several parts, in the elements and materials employed, and in the steps of the method, whereby the above named and other objects may effectively be attained.

A practical embodiment of the apparatus subject matter of my invention is diagrammatically represented in the accompanying drawing to which reference will now be made.

A suitable source of power, such as a buzzer or an alternating current generator is denoted by 1, and is connected to grounding electrodes 2, 3 which are spaced some distance apart on the surface of the ground. It will be seen that the current generated by the power source and flowing between the said two electrodes will energize the ground area between and surrounding the electrodes.

Within this energized area I locate three pick-up electrodes denoted by 4, 5, 6, which said electrodes are grounded and preferably arranged in line at arbitrary space intervals.

Electrodes 4 and 6 are connected by means of a two pole double throw selector switch, marked 7, in series with primaries 8 and 9 of transformers 10 and 11 respectively; and the said electrodes 4 and 6 are also connected in series by a two pole, double throw reversing switch 12; a three pole, double throw reversing switch 13, and an adjustable resistance 14, to the ends of the potentiometer 15.

Switch 13 serves to connect resistance 14 with potentiometer 15 and either electrode 4 or electrode 6.

A multiplier resistance 30 is arranged to be connected in series with potentiometer 15 by means of the multiplier switch 31, in order to extend the range of the said potentiometer.

The secondaries 16 and 17 of transformers 10 and 11, respectively, are connected in series by a condenser 18 to the potentiometer net-work 19, which consists of center-tapped potentiometers 20 and 21; which potentiometer 21 includes two fixed, electrically equal resistances 22 and 23. The combination 21, 22, and 23 is shunted across potentiometer 20. The value of condenser 18 should be such that, for a given frequency of the power source 1, its reactance equals the inductance of the secondaries 16 and 17, in order to eliminate any undesirable phase variations in this circuit. The total resistance of the potentiometer 20 should equal the total resistance of the potentiometer combination 21, 22, and 23, thereby ensuring the same amount of current flow in the two potentiometers 20 and 21.

The central pick-up electrode 5 is connected by the two pole, double throw selector switch 24 to the slider of potentiometer 20. The apparatus also includes a three pole double throw switch 25 and, when this switch is thrown to the left in the drawing, the center-tap of potentiometer 20 is connected in series by an amplifying device 26 to the righthand end of potentiometer 15, which latter, at the same time, is short-circuited by the center pole of switch 25. The output of amplifier 26 is connected to a suitable indicator 27. The network thus far described may be balanced by means of the variable resistance 14 and the potentiometer 20, the condition of balance being indicated by a zero reading of the indicator 27. If the three pole switch 25 is thrown to the right in the drawing, the short-circuit across potentiometer 15 is opened, with the result that the previously obtained balance of the network is destroyed. At the same time a new indicator circuit is thus established, which consists of the slider of potentiometer 15 connected in series with the amplifier 26 to the slider of potentiometer 21, the center-tap of which latter is connected to the center-tap of potentiometer 20. In this condition the network may again be brought to a condition of balance by adjusting the sliders of the two potentiometers 15 and 21.

By placing slider switch 24 in its center position, the connection with center-electrode 5 will be opened, and the sliders of potentiometer 20 and resistance 14 will be connected with a pick-up coil 28. By reversing selector switch 7, the network will be separated from pick-up electrodes 4 and 6 and connected to a pick-up coil 29. The said two pick-up coils 28 and 29 may be composed, for instance, of a suitable number of turns of insulated copper wire with a diameter of, say, from one to two feet.

Finally, if the selector switch 24 is thrown to the extreme right in the drawing, the pick-up coil 28 will be cut off from the network and its place be taken by the two electrodes 5 and 6.

By the use of this arrangement of apparatus it is possible to measure the following quantities:

1. The potential drop ratio between the electrodes 4, 5 and 5, 6.
2. The electro-motive force-potential drop ratio between the electro-motive force induced in pick-up coil 28 and the potential drop between electrodes 4, 6.
3. The electro-motive force potential drop ratio between the pick-up coil 28 and electrodes 4, 6 and the potential drop-electro-motive force ratio of the potential drop between electrodes 4, 6 and the electro-motive force induced in pick-up coil 29.

In order to measure the potential drop ratio, selector switch 7 must be connected to the outer electrodes 4 and 6, while selector switch 24 is connected to the center electrode 5. Reversing switch 12 may be connected either way, and the two position switch 25 should be moved to the left in the drawing. The network is then balanced by suitably operating the three pole switch 13, and adjusting the sliders of resistance 14 and potentiometer 20 until zero deflection is obtained on the indicator 27. The thus obtained balance is then upset by moving switch 25 to its righthand position in the drawing, whereupon a new balance may be established by adjusting the sliders of potentiometers 15 and 21, after operation of multiplier switch 21 if necessary, but without touching any of the prior adjustments. The resultant settings of the potentiometers 15 and 21 are then indicative of the unknown potential drop ratio, and the numerical values of the settings may be used to calculate this ratio by well known mathematical procedure.

In order to measure the ratio between the electro-motive force induced in pick-up coil 28 and the potential drop between electrodes 4, 6, selector switch 7 must be connected to the outer electrodes 4 and 6, and selector switch 24 to the pick-up coil 28. The three pole switch 25 is then returned to its lefthand position, and the network is balanced by suitably operating reversing switches 12 and 13 and adjusting the sliders of resistance 14 and potentiometer 20 till zero deflection is obtained on indicator 27. Thereupon switch 25 is moved to its righthand position, and the balance re-established by adjusting the sliders of potentiometers 15 and 21 without altering the prior adjustments. The resultant settings of potentiometers 15 and 21 are again indicative of the unknown electro-motive force-potential drop ratio, and the numerical value of this ratio may be calculated from the numerical values of the said two potentiometer settings.

In order to measure the ratio between the electro-motive forces induced in the pick-up coils 28 and 29, selector switch 7 is connected to pick-up coil 29, and selector switch 24 to pick-up coil 28. Switch 25 is then returned to its lefthand position, and the measuring operation as just described for the electro-motive force-potential drop ratio, is repeated.

Finally, in order to measure the ratio of the potential drop between stakes 4, 6 and the electro-potential drop between stakes 4, 6 and the electro-motive force induced in pick-up coil 29, selector switch 7 is connected to pick-up coil 29, and selector switch 24 to electrodes 4 and 6. Switch 25 is then moved to the lefthand position, and the measuring operation as described for the electro-motive force-potential drop ratio, is repeated.

It will be observed that all four of the measuring combinations hereinbefore set forth utilize the same measuring procedure, which consists of two successive balancing operations, each involving two different adjustments. The two adjustments for each balancing operation serve to take care of the two variables which are characteristic of alternating current measurements, to wit, amplitude and phase or in-phase and out-of-phase components. Generally speaking, one adjustment takes care of the in-phase and the other of the out-of-phase component, encountered in the electrical prospecting investigations. The two successive balancing operations are effective to eliminate such ground and instrument resistances as bear no relation to the object of the various determinations, or which have a tendency to confuse the real determination. In order better to elucidate these points, one of the measuring operations will now be set forth in detail:

Referring to the potential drop ratio, with selector switches 7 and 24 set to the left in the drawing, let switches 12 and 13 be set to the right, and switch 25 to the left. The potential between electrodes 4 and 6 will then cause a current to flow in the circuit composed of the elements indicated by the reference numerals 4, 7, 8, 12, 13, 25, 13, 14, 13, 12, 9, 7, 6 (25 being short-circuited). The central electrode 5 is connected with this circuit through the indicator branch circuit composed of the elements marked 24, 20, 25, 26, and 25. When in balanced position, no current is flowing through this indicator branch, and said balanced position may be realized by adjusting resistance 14 and potentiometer 20 until there is zero deflection of indicator 27. The function of resistance 14 is to compensate the network not only for unequal potential drop between electrodes 4, 5 and 5, 6, but also to compensate for the various contact and instrument resistances present in the outer electrode circuit. When using alternating current, the adjustment of the resistance 14 alone is not, however, sufficient to effect a complete neutralization of the network; and, in order to obtain such a condition of neutralization, it is necessary to provide for a separate compensation of the out-of-phase components that are still present in the indicator circuit. This may be accomplished by the use of the transformer coupled potentiometer combination 16, 17, 18, and 19, which provides a substantially ninety degrees out-of-phase component, the exact phase displacement of which depends upon the mutual relationship between the reactance of the condenser 18 and the inductance of the transformer secondaries 16 and 17. If it be assumed that the network is balanced, then the two potential drops $E_{45}$ and $E_{56}$ between stakes 4, 5 and 5, 6, are set forth by the following equations:

(1) $\quad E_{45}=i_1(R_4+\zeta_8)+i_2j2\pi fm_{10}-i_{20}P_{20}$ (2) $\quad E_{56}=i_1(R_6+\zeta_9+R_{14})+i_2j2\pi fm_{11}-i_{20}P_{20}$ where $i_1$ is the current flowing in the outer stake circuit $i_2$ is the current in the secondaries of transformers $i_{20}=i_2/2$ the current flowing in potentiometer 20

$R_4$ is the contact resistance at stake 4
$R_6$ is the contact resistance at stake 6
$R_{14}$ is the value of resistance 14
$\zeta_8$ is the impedance of primary 8
$\zeta_9$ is the impedance of primary 9
$m_{10}$ is the mutual inductance of transformer 10
$m_{11}$ is the mutual inductance of transformer 11
$P_{20}$ is the resistance between the slider and center-tap of potentiometer 20
$f$ is the frequency of the alternating current
$j$ and $\pi$ are two well known mathematical symbols.

The relation between the currents $i_1$ and $i_2$ is given by the equation:

(3) $\quad i_2=-jCi_1$ where C is an instrument constant and equals:

$$C=\frac{2\pi f(m_{10}+m_{11})}{Z_{16}+Z_{17}+Z_{18}+R_{19}}$$

In this expression:

$\zeta_{16}, \zeta_{17}$ are the impedances of the secondaries 16 and 17
$\zeta_{18}$ is the reactance of condenser 18
$R_{19}$ is the resultant resistance of potentiometer combination 19

Substituting the value of $i_2$ as given by Equation 3 in Equations 1 and 2, the following new equations obtain:

(4) $\quad E_{45}=i_1(R_4+\zeta_8-2\pi fm_{10}C-jC'P_{20})$ (5) $\quad E_{56}=i_1'(R_6+\zeta_9+R_{14}-2\pi fm_{11}C+jC'P_{20})$ where $C'=C/2$ Now, upon reversing switch 25, and thereby upsetting the equilibrium of the network, and then reestablishing compensation by adjusting the sliders of potentiometers 15 and 21, without changing any of the other adjustments, the following equations obtain:

(6) $\quad E_{45}=i_1'(R_4+\zeta_8+P_{15})+i_2'j2\pi fm_{10}+i_{20}'P_{20}-i_{21}'P_{21}$ (7) $\quad E_{56}=i_1'(R_6+\zeta_9+R_{14}+R_{15}-P_{15})+i_2'j2\pi fm_{11}-i_{20}'P_{20}+i_{21}'P_{21}$ where $i_1$ is the now resultant current flow in the outer stake circuit $i_2'$ is the now resultant current in the secondaries of transformers
$i_{21}=i_{20}=i_2'/2$ is the now resultant current in potentiometers 20 and 21
$P_{15}$ is the resistance between the right end and the slider of potentiometer 15
$R_{15}$ is the total resistance of potentiometer 15
$P_{21}$ is the resistance between the slider and center-tap of potentiometer 21.

The instruments factors C and C' are not affected by the insertion of potentiometer 15, therefore Equations 6 and 7 may be written:

(8) $\quad E_{45}=i_1'(R_4+\zeta_8+P_{15}-C2\pi fm_{10}-jC'(P_{20}-P_{21}))$ (9) $\quad E_{56}=i_1'(R_6+\zeta_9+R_{14}+(R_{15}-P_{15})-C2\pi fm_{11}+jC'(P_{20}-P_{21}))$ Now, dividing Equation 4 by Equation 5 and Equation 8 by Equation 9, the two current values $i_1$ and $i_1'$ cancel each other. Then separating in one of the thus obtained ratio equations one of the resistances common to both equations (for instance $R_4$), and substituting the resultant expression in the other ratio equation, all of the resistances common to both ratio equations cancel each other, and the following simple ratio equation obtains:

(10) $\quad \dfrac{E_{45}}{E_{56}}=\dfrac{P_{15}-jC'P_{21}}{R_{15}-P_{15}+jC'P_{21}}$ The only unknown factor remaining is the instrument constant $C'$. In many cases the numerical value of the product $C'P_{21}$ is small and may be neglected against the value of $P_{15}$ and $(R_{15}-P_{15})$. Whenever this happens Equation 10 may be written in the simplified form

(11) $\quad \dfrac{E_{45}}{E_{56}}=\dfrac{P_{15}}{R_{15}-P_{15}}$

If, on the other hand, the value of $C'P_{21}$ is not a negligible factor but must be taken into consideration, then the value of $C'$ can be easily ascertained with help of the following additional determination: The second balance of the instrument is upset by reversing multiplier switch 31, and a new balance is re-established by readjusting the sliders of potentiometers 15 and 21. If $P_{15}'$ and $P_{21}'$ are the now resultant potentiometer values, then the following equation obtains:

(12) $\quad \dfrac{E_{45}}{E_{56}}=\dfrac{P_{15}'-jC'P_{21}'}{R_{30}+R_{15}-P_{15}'+jC'P_{21}'}$ Combining Equations 10 and 12 and solving for $C'$:

(13) $\quad C'=\sqrt{\dfrac{P_{15}^2R_{15}'^2-P_{15}'^2R_{15}^2}{P_{21}'^2(R_{15}'^2-P_{15}^2)-P_{21}^2(R_{15}'^2-P_{15}'^2)}}$ where $R_{15}'=R_{15}+R_{30}$.

Substituting the value of $C'$ thus determined into Equation 10, the absolute ratio $r$ and the phase difference $p$ between the two potential drops $E_{45}$ and $E_{56}$ may be computed with help of the equations:

(14) $\quad r=\left|\dfrac{E_{45}}{E_{56}}\right|=\sqrt{\dfrac{P_{15}^2+(C'P_{21})^2}{(R_{15}-P_{15})^2+(C'P_{21})^2}}$

(15) $\quad \tan p=\dfrac{C'P_{21}R_{15}}{P_{15}(R_{15}-P_{15})+(CP_{21})^2}$

The same formulae apply to the other types of geo-electric investigations to which this apparatus is adapted.

The method and apparatus hereinabove set forth render possible the accurate and expeditious predetermination of valuable data concerning desirable sub-surface deposits, in spite of the presence of substances tending to inhibit or hinder such predetermination.

It will be understood that various changes may be resorted to in the form, construction and arrangement of the several parts of the apparatus; in the materials employed; and in the steps followed in carrying out the method; as well as in the order of the said steps; without departing from the spirit and scope of my invention: and hence I do not intend to be limited to the details herein shown and described, except as they may be included in the claims.

What I claim is:

1. In a method of electrical prospecting, the steps of establishing an electric ground field in a tract to be investigated, producing in a measuring network having a plurality of branches current flow due to the character of said ground field, balancing the current in said network by procedure including the adjustment of a potentiometer to compensate for phase displacement between different branches of said network, altering the current flow in said network, and re-establishing the balance of said network.

2. In a method of electrical prospecting, the steps of establishing an electric ground field in a tract to be investigated, producing in a measuring network having a plurality of branches current flow due to the character of said ground field, balancing the current in said network by field, balancing the current in said network by procedure including the adjustment of a variable resistance to compensate for difference in magnitude between different branches of said network, and the adjustment of a potentiometer to compensate for phase displacement between said different branches, altering the current flow in said network, and re-establishing the balance of said network.

3. In a method of electrical prospecting, the steps of establishing an electric ground field in a tract to be investigated, producing in a measuring network having a plurality of branches current flow due to the character of said ground field, balancing the current in said network by procedure including the adjustment of a potentiometer inductively coupled with said network to compensate for phase displacement between different branches of said network, altering the current flow in said network and re-establishing the balance of said network.

4. In a method of electrical prospecting, the steps of establishing an electric ground field in a tract to be investigated, producing in a measuring network a current flow due to the character of said ground field, balancing the current in said network by means including a potentiometer, altering the current flow in said network by means including a second potentiometer, and re-establishing the balance of said network.

5. In a method of electrical prospecting, the steps of establishing an electric ground field in a tract to be investigated, producing in a measuring network a current flow due to the character of said ground field, balancing the current in said network by means including a potentiometer, altering the current flow in said network by means including a second potentiometer inserted into said network, and re-establishing the balance of said network.

6. In a method of electrical prospecting, the steps of establishing an electric ground field in a tract to be investigated, producing in a measuring network a current flow due to the character of said ground field, balancing the current in said network by means including a potentiometer, altering the current flow in said network by means including a second potentiometer, and re-establishing the balance of said network by means including a third potentiometer.

7. In a method of electrical prospecting, the steps of establishing an electric ground field in a tract to be investigated, producing in a measuring network a current flow due to the character of said ground field, balancing the current in said network by means including a potentiometer, altering the current flow in said network by means including a second potentiometer, and re-establishing the balance of said network by means including a third potentiometer connected in series parallel combination with said first potentiometer.

8. In a method of electrical prospecting, the steps of establishing an electric ground field in a tract to be investigated, producing in a measuring network a current flow due to the character of said ground field, balancing the current in said network by means including a potentiometer, altering the current flow in said network by means including a second potentiometer, re-establishing the balance of said network by means including a third potentiometer and noting the settings of the said second and third potentiometers resulting from the re-establishing of the balance of said network.

9. In a method of electrical prospecting, the steps of establishing an electric ground field in a tract to be investigated, producing in a measuring network a current flow due to the character of said ground field, balancing the current in said network by means including a potentiometer, altering the current flow in said network by means including a second potentiometer, re-establishing the balance of said network by means including a third potentiometer connected in series parallel combination with said first potentiometer and noting the settings of the said second and third potentiometers resulting from the re-establishing of the balance of said network.

10. In an apparatus for electrical prospecting including means for establishing an electric ground field and a measuring network adapted for the generation therein of a current flow due to the character of the ground field, means for determining the ratio of the electromotive forces existing in different parts of said ground field comprising, the combination of a balancing network and an indicator circuit, said network including at least one potentiometer for the purpose of determining the numerical value of the said ratio and said circuit including at least one potentiometer for the purpose of compensating phase displacement between the electromotive forces.

11. In an apparatus for electrical prospecting including means for establishing an electric ground field and a measuring network adapted for the generation therein of a current flow due to the character of the ground field, means for determining the ratio of the electromotive forces existing in different parts of said ground field comprising, the combination of a balancing network and an indicator circuit, said network including at least one variable resistance and at least one potentiometer for the purpose of determining the numerical value of the said ratio and said circuit including at least one potentiometer for the purpose of compensating phase displacement between the electromotive forces.

12. In an apparatus for electrical prospecting including means for establishing an electric ground field and a measuring network adapted for the generation therein of a current flow due to the character of the ground field, means for determining the ratio of the electromotive forces existing in different parts of said ground field comprising, the combination of a balancing network and an indicator circuit, said network including at least one potentiometer for the purpose of determining the numerical value of the said ratio and said circuit including two potentiometers for the purpose of compensating phase displacement between the electromotive forces.

13. In an apparatus for electrical prospecting including means for establishing an electric ground field and a measuring network adapted for the generation therein of a current flow due to the character of the ground field, means for determining the ratio of the electromotive forces existing in different parts of said ground field comprising, the combination of a balancing network and an indicator circuit, said network including at least one variable resistance and at least one potentiometer for the purpose of determining the numerical value of the said ratio and said circuit including two potentiometers for the purpose of compensating phase displacement between the electromotive forces.

14. In an apparatus for electrical prospecting including means for establishing an electric ground field and a measuring network adapted for the generation therein of a current flow due to the character of the ground field, means for determining the ratio of the electromotive forces existing in different parts of said ground field comprising, the combination of a balancing network and an indicator circuit, said network including at least one potentiometer for the purpose of determining the numerical value of the said ratio, said circuit including two potentiometers for the purpose of compensating phase displacement between the electromotive forces, and means to adjust the phase of the current flowing in said last named two potentiometers.

15. In an apparatus for electrical prospecting including means for establishing an electric ground field and a measuring network adapted for the generation therein of a current flow due to the character of the ground field, means for determining the ratio of the electromotive forces existing in different parts of said ground field comprising, the combination of a balancing network and an indicator circuit, said network including at least one variable resistance and at least one potentiometer for the purpose of determining the numerical value of the said ratio, said circuit including two potentiometers for the purpose of compensating phase displacement between the electromotive forces, and means to adjust the phase of the current flowing in said last named two potentiometers.

THEODOR ZUSCHLAG.